(12) United States Patent
Lai et al.

(10) Patent No.: US 7,344,731 B2
(45) Date of Patent: Mar. 18, 2008

(54) RIGID GAS PERMEABLE LENS MATERIAL

(75) Inventors: Yu-Chin Lai, Pittsford, NY (US); James A. Bonafini, Jr., Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 198 days.

(21) Appl. No.: 11/145,672

(22) Filed: Jun. 6, 2005

(65) Prior Publication Data

US 2006/0276605 A1 Dec. 7, 2006

(51) Int. Cl.
*A61F 2/00* (2006.01)
*C08G 59/14* (2006.01)

(52) U.S. Cl. .................. 424/423; 525/474; 525/523
(58) Field of Classification Search ............. 424/423; 525/474, 523
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,113,224 A | 9/1978 | Clark et al. | |
| 4,136,250 A | 1/1979 | Mueller et al. | |
| 4,197,266 A | 4/1980 | Clark et al. | |
| 4,486,577 A | 12/1984 | Mueller et al. | |
| 4,605,712 A | 8/1986 | Mueller et al. | |
| 5,034,461 A | 7/1991 | Lai et al. | |
| 5,260,000 A | 11/1993 | Nandu et al. | |
| 5,271,875 A | 12/1993 | Appleton et al. | |
| 5,346,976 A | 9/1994 | Ellis et al. | |
| 5,480,946 A | 1/1996 | Mueller et al. | |
| 2002/0128414 A1 | 9/2002 | James et al. | |
| 2005/0100579 A1* | 5/2005 | Lai et al. | 424/423 |

FOREIGN PATENT DOCUMENTS

WO   WO 03/037944 A1   5/2003

OTHER PUBLICATIONS

Yu-Chin Lai, "The Role of Bulky Polysiloxanylalkyl Methacrylates in Polyurethane-Polysiloxane Hydrogels", Journal of Applied Polymer Science, vol. 60, 1193-1199 (1996), John Wiley & Sons, Inc.
Yu-Chin Lai et al., "Surface Wettability Enhancement of Silicone Hydrogel Lenses by Processing with Polar Plastic Molds", J. Biomed Mater Res, vol. 35, 349-356 (1997), John Wiley & Sons, Inc.
Yu-Chin Lai, "Novel Polyurethane-Silicone Hydrogels", Journal of Applied Polymer Science, vol. 56, 301-310 (1995), John Wiley & Sons, Inc.

* cited by examiner

*Primary Examiner*—Robert D. Harlan
(74) *Attorney, Agent, or Firm*—Joseph Barrera

(57) ABSTRACT

A copolymer useful as a rigid gas permeable contact lens material is the polymerization product of a monomeric mixture comprising a polysiloxane-containing urethane or urea prepolymer endcapped with polymerizable ethylenically unsaturated radicals.

26 Claims, No Drawings

RIGID GAS PERMEABLE LENS MATERIAL

FIELD OF THE INVENTION

This invention relates to copolymers useful as rigid gas permeable (RGP) contact lens materials.

BACKGROUND OF THE INVENTION

Contact lenses may be classified in two general categories, soft and hard lenses. Soft contact lenses are made of a material with a relatively low modulus, such that the lenses are flexible and bendable. Soft hydrogel contact lenses are an example. Hard contact lenses have a much higher modulus and are relatively stiff. One class of hard contact lens materials is RGP copolymers. RGP materials are composed of a silicon-containing copolymer and are able to transmit gases, particularly oxygen. Thus, oxygen can be transmitted through an RGP contact lens and to the cornea while the lens is worn.

U.S. Pat. No. 5,346,976 (Ellis et al.) describes various RGP copolymers. The preferred copolymers of U.S. Pat. No. 5,346,976 have been successful commercially. However, the oxygen permeability of these preferred copolymers is generally no greater than 140 barrers.

Oxygen permeability is a desirable property for contact lens materials since the human cornea will be damaged if it is deprived of oxygen for an extended period. Oxygen permeability is conventionally expressed in units of barrer, also called Dk. Oxygen transmissibility is a property of contact lens materials related to oxygen permeability. Oxygen transmissibility is oxygen permeability divided by lens thickness, or Dk/t. Oxygen permeability of rigid contact lens materials is important. As an example, orthokeratology has gained in popularity in recent years. Orthokeratology involves wearing a rigid contact lens overnight, with the lens being designed to intentionally alter the shape the cornea. As another example, some lens designs, such as toric lenses or multifocal lenses, may be relatively thick, meaning less oxygen is transmitted through the lens. Thus, unless the lens has a sufficiently high oxygen permeability, the lens may not be safe for overnight wear.

Currently, most RGP contact lenses are manufactured by cutting the lens on a lathe. As an example, the RGP copolymer is cast in the form of a rod, the rod is cut into cylindrical disks (also referred to as buttons), and lenses are lathed from these buttons. Thus, an RGP material must have sufficient toughness, and not be brittle, so that it is machineable.

A challenge in developing improved RGP copolymers is that modifying a copolymer to increase oxygen permeability frequently compromises other desired properties of the material, such as machineability or optical clarity. Also, increasing the silicone content to increase oxygen permeability may result in a surface that is not sufficiently wettable by the tear film when worn.

SUMMARY OF THE INVENTION

This invention provides copolymers useful as a rigid gas permeable contact lens material, and contact lenses formed therefrom. The copolymers are the polymerization product of a monomeric mixture comprising a polysiloxane-containing urethane or urea prepolymer endcapped with polymerizable ethylenically unsaturated radicals. The monomer mixture may further include one or more of the following comonomers: a hydrophilic monomer; a fluorinated monomer; an ethylenically unsaturated monofunctional silicon-containing monomer; hardness modifying nonfluorinated (meth)acrylate monomer; a supplemental crosslinking agent; a polymerization initiator; an ultraviolet blocking agent; or a colorant.

The copolymers of this invention provide RGP contact lens materials that have relatively high oxygen permeability, yet still are optically clear and machineable, and have a wettable surface.

DETAILED DESCRIPTION OF PREFERRED EMBODIMENTS

This invention provides a copolymer useful as a rigid gas permeable contact lens material that is the polymerization product of a monomeric mixture comprising a polysiloxane-containing urethane or urea prepolymer endcapped with polymerizable ethylenically unsaturated radicals.

The term "polysiloxane-containing" denotes that the prepolymer includes polysiloxane-containing soft segments. These segments are preferably derived from polysiloxanes endcapped with hydroxyl or amino radicals and represented by the following formula (PS'):

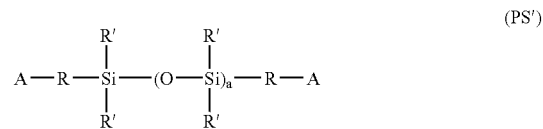

(PS')

wherein each A is a hydroxyl or amino radical;

each R is independently selected from an alkylene group having 1 to 10 carbon atoms wherein the carbon atoms may include ether, urethane or urea linkages therebetween;

each R' is independently selected from hydrogen, monovalent hydrocarbon radicals or halogen substituted monovalent hydrocarbon radicals wherein the hydrocarbon radicals have 1 to 20 carbon atoms which may include ether linkages therebetween, and a is at least 1.

Preferred R radicals are alkylene optionally substituted with ether radicals. Preferred R' radicals include: alkyl groups, phenyl groups, fluoro-substituted alkyl groups and alkenyl groups, optionally substituted ether groups. Especially preferred R' radicals include: alkyl, such as methyl; or fluoroalkyl optionally including ether linkages, such as —CH2—CH2—CH2—O—CH2—(CF2)z-H where z is 1 to 6.

Preferably, a is about 10 to about 100, more preferably about 15 to about 80. The Mn of PS ranges from 1000 to 8000, more preferably 2000 to 6000.

Various polysiloxane-diols and polysiloxane-diamines are commercially available. Additionally, representative syntheses of polysiloxanes are provided in the Examples.

The term "prepolymer endcapped with polymerizable ethylenically unsaturated radicals" denotes that the prepolymer is polymerizable and is endcapped with the ethylenically unsaturated radicals. The prepolymers are endcapped at both ends with a polymerizable ethylenic unsaturated radical. Preferred terminal polymerizable radicals are represented by formula (M'):

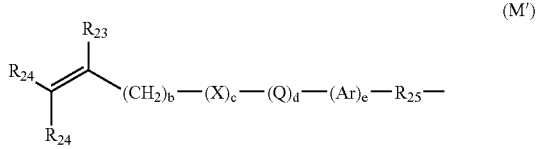

(M')

wherein:
$R_{23}$ is hydrogen or methyl;
each $R_{24}$ is hydrogen, an alkyl radical having 1 to 6 carbon atoms, or a —CO—Y—$R_{26}$ radical wherein Y is —O—, —S— or —NH—;
$R_{25}$ is a divalent alkylene radical having 1 to 10 carbon atoms;
$R_{26}$ is a alkyl radical having 1 to 12 carbon atoms;
Q denotes —CO—, —OCO— or —COO—;
X denotes —O— or —NH—;
Ar denotes an aromatic radical having 6 to 30 carbon atoms; b is 0 to 6; c is 0 or 1; d is 0 or 1; and e is 0 or 1. Suitable endcapping precursors, for forming the M radicals, include: hydroxy-terminated (meth)acrylates, such as 2-hydroxyethylmethacrylate, 2-hydroxyethylacrylate, and 3-hydroxypropylmethacrylate; and amino-terminated (meth)acrylates, such as t-butylaminoethylmethacrylate and aminoethylmethacrylate; and (meth)acrylic acid. (As used herein, the term "(meth)" denotes an optional methyl substituent. Thus, terms such as "(meth)acrylate" denotes either methacrylate or acrylate, and "(meth)acrylic acid" denotes either methacrylic acid or acrylic acid.)

The term "urethane or urea prepolymer" denotes that the prepolymer includes urethane and/or urea linkages therein. Various polysiloxane-containing urethane or urea prepolymers suitable for this invention will now be described.

A first class of polysiloxane prepolymers comprises blocks (I) and (II) and is terminated at each end with an ethylenic unsaturated radical:

 (I)

 (II)

wherein:
each Dii is independently a diradical residue of a diisocyanate;
each Diol is independently a diradical residue of a diol having 1 to 10 carbon atoms;
each PS is independently a diradical residue of a polysiloxane-diol or -diamine (i.e., the diradical residue of PS', where A would be —O— or —NH—);
each * is independently —NH—CO—NH—, —NH—COO— or —OCO—NH—;
x represents the number of blocks (I) and is at least 1, and y represents the number of blocks (II) and is at least 1.
This class of prepolymers includes those represented by the general formulae:

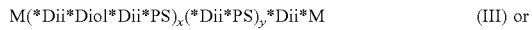 (III) or

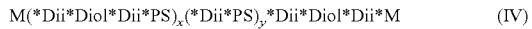 (IV)

wherein Dii, Diol, PS, *, x and y are as defined above, and M is a polymerizable ethylenically unsaturated radical.

Generally, the blocks of formula (I) may be characterized as composed of strong hard segments (represented by *Dii*Diol*Dii*) and soft segments (represented by PS).

Generally, the blocks of formula (II) may be characterized as composed of weaker hard segments (represented by *Dii*) and soft segments (represented by PS). The distribution of these weaker and strong hard blocks (I) and (II) may be random or alternate, where x and y represent the total number of blocks of respective structures in the prepolymer; stated differently, it is not necessary in formulae (III) and (IV) that all blocks of formula (I) are directly linked to each other. The distribution of these blocks may be controlled by the sequence of addition of the polysiloxane, diisocyanate and short chain diol ingredients during the preparation of the prepolymer.

The prepolymers include polysiloxane-containing soft segments, represented by PS in formulae (I), (II), (III) and (IV). More particularly, this polysiloxane-containing segment is derived from polysiloxanes endcapped with hydroxyl or amino radicals, such as polysiloxane segments represented by formula (PS').

Preferably, a in formula (III) and (IV) is about 10 to about 100, more preferably about 15 to about 80. The Mn of PS ranges from 1000 to 8000, more preferably 2000 to 6000.

The strong hard segments of the prepolymers include the residue of a diol, represented by Diol in formulae (I), (III) and (IV). Preferred Diol radicals include the diradical residue of an alkyl diol, a cycloalkyl diol, an alkyl cycloalkyl diol, an aryl diol or an alkylaryl diol having 1 to 10 carbon atoms and which may contain ether, thio or amine linkages in the main chain. Representative diols include 2,2-(4,4'-dihydroxydiphenyl)propane (bisphenol-A), 4,4'-iso-propylidine dicyclohexanol, ethoxylated and propoxylated bisphenol-A, 2,2-(4,4'-dihydroxydiphenyl)pentane, 1,1'-(4,4'-dihydroxydiphenyl)-p-diisopropyl benzene, 1,3-cyclohexane diol, 1,4-cyclohexane diol, 1-4-cyclohexane dimethanol, neopentyl glycol, 1,4-butanediol, 1,3-propanediol, 1,5-pentanediol, ethylene glycol, diethylene glycol and triethylene glycol. Especially preferred are alkylene and etherified alkylene diols having 1 to 10 carbon atoms.

The aforementioned polysiloxane-containing segments and diol residue segments are linked via diisocyanates that react with hydroxyl- or amino-functionality of the polysiloxane-containing segments and diols. Generally, any diisocyanate may be employed. These diisocyanates may be aliphatic or aromatic, and include alkyl, alkyl cycloalkyl, cycloalkyl, alkyl aromatic and aromatic diisocyanates preferably having 6 to 30 carbon atoms in the aliphatic or aromatic moiety. Specific examples include isophorone diisocyanate, hexamethylene-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, and cyclohexane diisocyanate.

Generally, higher x values results in prepolymers have a higher number of polar urethane/urea linkages, and polarity of the prepolymer is important to ensure compatibility with hydrophilic co-monomers. Generally, higher y values results in prepolymers with a higher percentage of silicon, resulting in higher oxygen permeability.

The prepolymers are endcapped at both ends with a polymerizable ethylenic unsaturated radical, represented by M in formulae (III) and (IV). Representative M radicals are represented by formula (M').

A first representative reaction scheme for forming the prepolymers is as follows. First, a diisocyanate is reacted with a diol, at a molar ratio of 2:1, respectively.

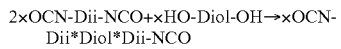

In this scheme, * designates a urethane radical —NH—COO— or —OCO—NH—. Generally, this reaction is conducted in the presence of a catalyst, such as dibutyl tin dilaurate and- in a solvent, such as methylene chloride, and under reflux. Then, a diisocyanate and the polysiloxane-diol are added, with the ratio of total diisocyanates (x+y) to polysiloxane-diol being at least 1.1. (Generally, $2 \leq x+y \leq 11$; x>0; y>0.)

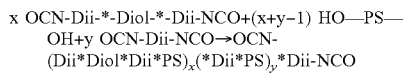

Finally, this product is endcapped with the polymerizable ethylenically unsaturated radical.

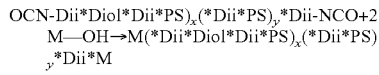

A second representative reaction scheme for forming the prepolymers of formula (I), (II), (III) and/or (IV) is as follows. First, a diisocyanate is reacted with the polysiloxane-diol at a molar ratio shown below, where (1+1/m) preferably ranges from 1.05 to 1.9, most preferably from 1.2 to 1.5.

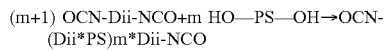

In this scheme, * again designates a urethane radical —NH—COO— or —OCO—NH—. Generally, this reaction is conducted in the presence of a catalyst, such as dibutyl tin dilaurate and in a solvent, such as methylene chloride, and under reflux. Then, the diol is added, with the molar ratio selected based on the desired ratio of strong and weak hard segments, with reflux continued, where z1/z2 is equal to or lower than 2 but higher than 1.

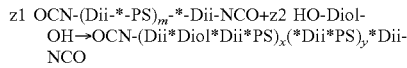

Finally, this product is endcapped with the polymerizable ethylenically unsaturated radical.

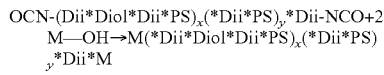

In the above reaction schemes, the reaction of diols with diisocyanates yields urethane radicals (—NH—COO— or —OCO—NH—). Alternatively, the reaction of diamines with diisocyantes would yield urea radicals (—NH—CO—NH—). Other methods for forming urethane or urea polymers are known in the art.

A second class of polysiloxane prepolymers are represented by the formula:

$$M(*Dii* \text{ } PS)_x*Dii*M \qquad (V)$$

wherein:

Dii, PS, * and M have the same meanings as above. Generally, the *Dii*PS blocks of formula (I) may be characterized as composed of relatively weak hard segments (represented by *Dii*) and soft segments (represented by PS). In formula (V), x is at least two, more preferably at least three.

A representative reaction scheme for forming this class of prepolymers is as follows. First, a diisocyanate is reacted with the polysiloxane-diol.

In this scheme, * designates a urethane radical —NH—COO— or —OCO—NH—. Generally, this reaction is conducted in the presence of a catalyst, such as dibutyl tin dilaurate and in a solvent, such as methylene chloride, and under reflux.

Finally, this product is endcapped with the polymerizable ethylenically unsaturated radical.

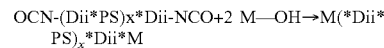

In the above reaction scheme, the reaction of the polysiloxane-diol with the diisocyanate yields urethane radicals (—NH—COO— or —OCO—NH—). Alternatively, the reaction of poly-siloxane-diamines with diisocyanates would yield urea radicals (NH—CO—NH—). Other methods for forming urethane or urea polymers are known in the art.

Additional polysiloxane-containing prepolymers are represented by the formulae:

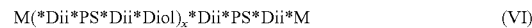

where Dii, PS, Diol, * and Dii have the same meanings as above. In formulae (VI) and (VII), x is at least one. Generally, these prepolymers are composed of alternating strong hard segments (represented by *Dii*Diol*Dii*) and soft segments (represented by PS). These prepolymers may be prepared by methods generally known in the art, including the general methods disclosed in U.S. Pat. No. 5,034,461 (Lai et al.), the entire disclosure of which is incorporated herein by reference.

A further class of polysiloxane prepolymers are represented by the formula:

wherein:

Dii, PS, * and M have the same meanings as above, and x' is zero or an integer of at least one. Generally, the *PS*Dii blocks of formula (I) may be characterized as composed of relatively weak hard segments (represented by *Dii*) and soft segments (represented by PS).

A representative reaction scheme for forming this class of prepolymers is as follows. First, a diisocyanate is reacted with the polysiloxane-diol.

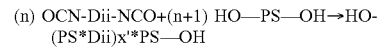

In this scheme, * designates a urethane radical —NH—COO— or —OCO—NH—. Generally, this reaction is conducted in the presence of a catalyst, such as dibutyl tin dilaurate and in a solvent, such as methylene chloride, and under reflux. Finally, this product is endcapped with the polymerizable ethylenically unsaturated radical.

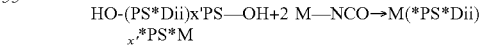

In the above reaction scheme, the reaction of the polysiloxane-diol with the diisocyanate yields urethane radicals (—NH—COO— or —OCO—NH—). Alternatively, the reaction of poly-siloxane-diamines with diisocyanates would yield urea radicals (NH—CO—NH—). Other methods for forming urethane or urea polymers are known in the art.

Preferably, the prepolymer has a molecular weight (Mn) of at least 10,000, more preferably at least 15,000, and most preferably at least 20,000.

The copolymers of this invention are formed by copolymerizing the polysiloxane prepolymers with one or more comonomers. Since the prepolymers are endcapped with polymerizable ethylenically unsaturated radicals, they are polymerizable by free radical polymerization. The monomeric mixtures employed in the invention include conventional lens-forming or device-forming monomers. (As used herein, the term "monomer" or "monomeric" and like terms denote relatively low molecular weight compounds that are polymerizable by free radical polymerization, as well as higher molecular weight compounds also referred to as "prepolymers", "macromonomers", and related terms.) For copolymers, the subject prepolymers are included in the monomer mixture at 5 to 95 weight percent, preferably 10 to 70 weight percent, most preferably 10 to 50 weight percent.

A first class of suitable comonomers includes hydrophilic monomers. Hydrophilic monomers are useful for increasing hydrophilicity and improving wettability of the resultant copolymer. Conventional hydrophilic monomers include: hydrophilic (meth)acrylates, such as 2-hydroxyethyl methacrylate; hydrophilic (meth)acrylamides, such as methacrylamide and N,N-dimethylacrylamide; (meth)acrylic carboxylic acids, such as methacrylic acid; and vinyl lactams, such as N-vinylpyrrolidone. The hydrophilic monomer may be included in the monomeric mixture at about 1 to about 25 weight percent, more preferably at about 2 to about 20 weight percent.

A second class of suitable comonomers includes ethylenically unsaturated, monofunctional organosiloxane monomers, i.e., monomers including only one ethylenically unsaturated radical and exclusive of the polysiloxane-containing prepolymer. These monomers are useful for increasing oxygen permeability of the copolymer. One suitable class of organosiloxane monomers include known bulky, monofunctional polysiloxanylalkyl monomers represented by Formula (IX):

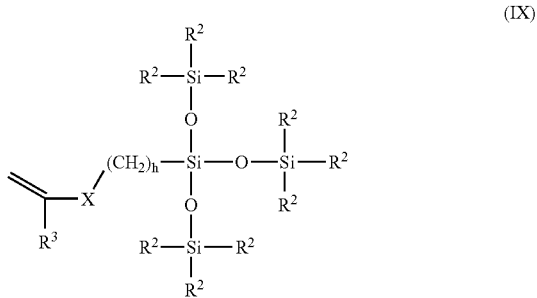

(IX)

wherein X denotes —COO—, —CONR$^4$—, —OCOO—, or —OCONR$^4$— where each where R$^4$ is H or lower alkyl; R$^3$ denotes hydrogen or methyl; h is 1 to 10; and each R$^2$ independently denotes a lower alkyl or halogenated alkyl radical, a phenyl radical or a radical of the formula —Si(R$^5$)$_3$ wherein each R$^5$ is independently a lower alkyl radical or a phenyl radical. Such bulky monomers specifically include methacryloxypropyl tris(trimethylsiloxy)silane (TRIS), pentamethyldisiloxanyl methylmethacrylate, tris(trimethylsiloxy)methacryloxy propylsilane, methyldi(trimethylsiloxy) methacryloxymethyl silane, 3-[tris(trimethylsiloxy)silyl] propyl vinyl carbamate, and 3-[tris(trimethylsiloxy)silyl] propyl vinyl carbonate.

The organosiloxane monomer may be included in the monomeric mixture at about 5 to about 60 weight percent, more preferably at about 20 to about 50 weight percent.

A third class of suitable comonomers includes fluorinated monomers. A first example is fluorinated itaconates of formula (X):

$$CH_2=C(COOX)-CH_2-COOY \quad (X)$$

wherein X and Y, which may be the same or different, are independently: hydrogen; $C_1$-$C_{18}$ alkyl or fluoro-substituted alkyl groups; $C_5$-$C_{18}$ cycloalkyl or fluoro-subsfituted cycloalkyl groups; $C_2$-$C_6$ alkenyl groups or fluoro-substituted alkenyl groups; phenyl groups or fluoro-substituted phenyl groups; benzyl or fluoro-substituted benzyl groups; phenethyl or fluoro-substituted phenethyl groups; or $C_2$-$C_{18}$ ether or fluoro-substituted ether groups; provided that at least one of X and Y is one of the aforementioned fluoro-substituted radicals. Representative itaconates include bis(1, 1,1,3,3,3-hexafluoro-2-propyl)itaconate, bis(2,2,2-trifluoroethyl)itaconate, bis(1H,1H-perfluorooctyl)itaconate, bis(1H, 1H,1H-perfluoroudecyl)itaconate, bis(perfluoro-t-butyl) itaconate, bis(pentafluorophenyl)itaconate, bis(2H,2H-perfluorobe)itaconate, and bis(pentafluorophenylmethyl) itaconate.

A second example of a fluorinated monomer is fluorinated (meth)acrylates of formula (XI):

$$CH_2=C(R^{20})-COO-R^{21} \quad (XI)$$

where R$^{20}$ is hydrogen or methyl, and R$^{21}$ is $C_1$-$C_{18}$ fluoro-substituted alkyl groups; $C_5$-$C_{18}$ fluoro-substituted cycloalkyl groups; $C_2$-$C_6$ fluoro-substituted alkenyl groups; fluoro-substituted phenyl groups; fluoro-substituted benzyl groups; fluoro-substituted phenethyl groups; or $C_2$-$C_{18}$ fluoro-substituted ether groups. Such monomers are useful for modifying the hardness of the resultant copolymer. Representative compounds include 1,1,1,3,3,3-hexafluoro-2-propyl methacrylate, pentafluorophenyl methacrylate, perfluoroethyl methacrylate, and 2,2,2-trifluoroethyl methacrylate.

The fluorinated monomer is preferably employed at 5 to 60% by weight of the monomeric mixture from which the copolymer is prepared in order to provide copolymers having sufficient rigidity and hardness. According to preferred embodiments, the itaconate is present at 10 to 50 weight percent in the monomeric mixture.

A fourth class of suitable comonomers includes nonfluorinated aliphatic (meth)acrylates. Such monomers are useful for modifying the hardness of the resultant copolymer, and are preferably an ester of a C1-C20 monohydric or polyhydric alkanol or phenol and (meth)acrylic acid. Representative monomers include: alkyl (meth)acrylates, such as methyl methacrylate, ethyl methacrylate, and neopentyl methacrylate; cycloalkyl-containing (meth)acrylates, such as cyclohexyl methacrylate; and phenyl methacrylate. When this (meth)acrylate is included in the monomeric mixture, it is preferably present at 0.5 to about 50 weight percent, more preferably at about 2 to about 20 weight percent.

The monomer mixture includes a crosslinking monomer (a crosslinking monomer being defined as a monomer having multiple polymerizable functionalities). Since the subject polysiloxane-containing prepolymers are endcapped with at least two polymerizable radicals, these prepolymers will function as a crosslinker. Optionally, a supplemental crosslinking monomer may be added to the initial monomeric mixture. Representative crosslinking monomers include: divinylbenzene, allyl methacrylate, ethyleneglycol dimethacrylate, neopentylglycol dimethacrylate, tetraethyleneglycol dimethacrylate, polyethyleneglycol dimethacrylate, vinyl carbonate derivatives of the glycol dimethacrylates, and methacryloxyethyl vinylcarbonate. When a supplemental crosslinking agent is employed, this monomeric material may be included in the monomer mixture at 0.1 to 20 weight percent, more preferably at 0.2 to 10 weight percent.

Other optional components of the monomeric mixture include conventional free radical initiators, which are generally employed at 0.01 to 2% by weight, coloring agents (colorants) and/or ultraviolet blocking compounds.

According to preferred embodiments, the copolymers are the polymerization product of a monomer mixture comprising: the polysiloxane-containing urethane or urea prepolymer; a hydrophilic monomer; a fluorinated monomer; an ethylenically unsaturated monofunctional silicon-containing monomer; a hardness modifying (meth)acrylate monomer; and at least one member selected from the group consisting of a polymerization initiator, an ultraviolet blocking agent, and a colorant.

The monomeric mixtures can be polymerized by methods known in the art, preferably in the presence of heat or ultraviolet radiation, and if desired, the copolymers can be treated with gamma radiation to reduce any unreacted monomers. Preferably, the mixtures are molded in a shape which is subsequently machined into the form of a contact lens, such as rod stock, a lens button, or a lens blank containing one finished surface. Alternately, the mixtures can be molded directly in the form of a contact lens.

In the case where the copolymers are formed into the shape of a cylindrical disk (button), this disk may be packaged with printed instructions for lathing a rigid gas permeable contact lens from the disk.

Most RGP contact lenses today are manufactured by lathing at least one surface from a blank of the copolymer, and in many cases, by lathing both the front and back surfaces as well as the diameter from a cylindrical button. Therefore, it is important that the copolymer is not only optically clear, but also machineable. Accordingly, the copolymers should have: a toughness of at least 1.2 Mpa·mm, more preferably at least 1.5 Mpa·mm; a Rockwell hardness of at least 90; a Shore D hardness of at least 70; and/or a modulus of at least 800 Mpa.

Toughness may be measured according to ASTM D 790M-86 on 0.5 mm disk samples. Modulus may be measured according to ASTM D-1708a, employing an Instron (Model 4502) instrument where the polymer sample is immersed in borate buffered saline; an appropriate size of the sample is gauge length 22 mm and width 4.75 mm, where the sample further has ends forming a dogbone shape to accommodate gripping of the sample with clamps of the Instron instrument, and a thickness of 200+50 microns.

Rockwell hardness may be measured according to ASTM D785, employing an Rockwell hardness instrument, such as Rockwell Hardness Tester Model 3TTB (Wilson Instrument), on disk samples having a smooth, flat surface. Shore D hardness may be measured according to ASTM D2240, employing a Shore D durometer on disk samples. Preferably, for both hardness methods, the samples are preconditioned by storing the samples for at least 40 hours in a chamber with 50% controlled humidity, such as by the method of ASTM E104-85.

Additionally, the copolymers preferably have an oxygen permeability of at least 100 barrers, more preferably at least 120 barrers, and most preferably at least 140 barrers, when measured by the method discussed in the Examples infra. Achieving such high Dk values while maintaining other desirable properties for RGP contact lens materials represents a considerable advancement in the art. And as seen in the following Example, copolymers having Dk of at least 160 barrers are achieved by this invention.

The following examples illustrate various preferred embodiments of this invention.

EXAMPLE 1

Preparation of $\alpha,\omega$-bis(4-hydroxybutyl)polydimethylsiloxane (Mn about 4000)

A 2-L, three-neck round bottom flask equipped with one reflux condenser, was charged with the following: 50.8 grams (0.182 moles) of 1,3-bishydroxybutyl tetramethyldisiloxane; 985.6 grams (8.1 mole) of dimethoxydimethylsilane; 145.8 grams (8.1 mole) of distilled water; and 18.2 mL of concentratd hydrochloric acid. The mixture was heated at 60° C. for one hour. Methanol was then distilled off over a 5-hour period, with 650 mL collected. Six hundred and fifty mL of 6N hydrochloric acid was then added and the contents were refluxed for 4 hours. The crude product was then separated from the aqueous layer. Ether was added and the solution was extracted twice with 0.5 N sodium bicarbonate solution, and then with distilled water until the washing had neutral pH. The product was then added slowly into a mixture of methanol/water (77.5/22.5). The bottom organic layer was separated, ether was added, and dried with magnesium sulfate. Ether was then stripped under vacuum at room temperature and the residue was further stripped under vacuum (0.05 mm torr) at 80° C. to give the final product (510 grams). The molecular weight (Mn) as determined by titration was 4044.

EXAMPLE 2

Preparation of $\alpha,\omega$-bis(4-hydroxybutyl)polydimethylsiloxane (Mn about 3600)

The general procedure of Example 1 was followed, except the molar ratio of 1,3-bishydroxybutyl tetramethyldisiloxane to dimethoxydimethylsilane was 1:39 instead of 1:45 as in Example 1. The Mn of the product as determined by titration was 3689.

EXAMPLE 3

Preparation of a polydimethylsiloxane-based polyurethane prepolymer, using $\alpha,\omega$-bis(4-hydroxybutyl)polydimethylsiloxane (Mn about 4000)

A dry 3-neck, 1000-mL round bottom flask was connected to a nitrogen inlet tube and a reflux condenser. Then, the following were added to the flask and the contents were refluxed: isophorone diisocyanate (16.916 g, 0.0761 mole); diethylene glycol (4.038 g, 0.0380 mole); dibutyl tin dilaurate (0.383 g); and 140 mL of methylene chloride. After 16 hours, the amount of isocyanate was determined by titration to decrease to 47.0%. Then $\alpha,\omega$-bis(4-hydroxybutyl)polydimethylsiloxane (102.56 g, 0.02536 mole) from Example 1 was added into the flask. The refluxing was continued for 33 hours, and the amount of isocyanate dropped to 14.1% of the original, as determined by titration. The contents were then cooled to ambient temperature. 2-Hydroxyethyl methacrylate (2.2928 g) and 1,1'-bi-2-phenol (0.0129 g) were then added, and the contents were stirred at ambient temperature until the isocyanate peak at 2267 cm−1 disappeared from IR spectrum of the product (about 20 hours). The solvent was then stripped under reduced pressure to give the product in quantitative yield.

EXAMPLE 4

Preparation of a polydimethylsiloxane-based polyurethane prepolymer, using α,ω-bis(4-hydroxybutyl)polydimethylsiloxane (Mn about 3600)

The general procedure of Example 3 was followed, except the polysiloxane of Example 2 was used. About 950 grams of prepolymer were prepared,

EXAMPLES 5-18

Copolymers

Copolymers were made by combining the components listed in Tables 1, 2 and 3, where each table lists parts by weight of the various components. In addition, each formulation included minor amounts of Vazo-52 thermal initiator, Vazo 64 thermal initiator, and D&C Green #6 dye. The formulations were added to cylindrical tubes, and rods were cast by thermal curing of the formulations contained in the tubes in a heated water bath at a temperature 40° C. for 3 days, following by placing the tubes in an oven at 65° C. for 2 days.

The following abbreviations are used in Tables 1 to 3:
Prepolymer Ex 3—the polydimethylsiloxane-based polyurethane prepolymer of Example 3
Prepolymer Ex 4—the polydimethylsiloxane-based polyurethane prepolymer of Example 4
M2D25—a methacrylate-capped polydimethylsiloxane prepolymer of the formula

$CH_2=CH(CH_3)COO(CH_2)_4$—$Si(CH_3)(CH_3)O$—$[Si(CH_3)(CH_3)O]_w$—$OCO(CH_2)_4 CH(CH_3)=CH_2$ where w is about 25
Tris—methacryloxypropyl tris(trimethylsiloxy)silane
Tris/Dimer—90% of Tris and 10% of its dimer
NVP—N-vinylpyrrolidone
MAA—methacrylic acid
HFIPMA—1,1,1,3,3,3-hexafluoro-2-propyl methacrylate
BHI—bis(1,1,1,3,3,3-hexafluoro-2-propyl) itaconate
MMA—methyl methacrylate
NPGDMA—neopentyl glycol dimethacrylate Oxygen permeability (also referred to as Dk) is determined by ISO/FATT or polarography method (ISO 9913) Other methods and/or instruments may be used as long as the oxygen permeability values obtained therefrom are equivalent to the described method. The oxygen permeability of silicon-containing contact lenses is measured by the polarographic method (ANSI Z80.20-1998) using an O2 Permeometer Model 201T instrument (Createch, Albany, Calif. USA) having a probe containing a central, circular gold cathode at its end and a silver anode insulated from the cathode. Measurements are taken only on pre-inspected pinhole-free, flat film samples of three different center thicknesses ranging from 150 to 600 microns. Center thickness measurements of the film samples may be measured using a Rehder ET-1 electronic thickness gauge. Generally, the film samples have the shape of a circular disk. Measurements are taken with the film sample and probe immersed in a bath containing circulating phosphate buffered saline (PBS) equilibrated at 35° C.±0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample. In some cases, it may be useful to employ a Teflon polymer membrane, e.g., having a circular disk shape, between the probe cathode and the film sample. In such cases, the Teflon membrane is first placed on the pre-moistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value. At least two Dk measurements per thickness, and meeting R2 value, are obtained. Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/− 8.8% of the Repository values established by William J. Benjamin, et al., The Oxygen Permeability of Reference Materials, Optom Vis Sci 7 (12s): 95 (1997), the disclosure of which is incorporated herein in its entirety:

| Material Name | Repository Values | Lower Limit | Upper Limit |
|---|---|---|---|
| Fluoroperm 30 | 26.2 | 24 | 29 |
| Menicon EX | 62.4 | 56 | 66 |
| Quantum II | 92.9 | 85 | 101 |

Tan delta temperature was determined by dynamic mechanical analysis, and serves as a measure of material dimensional stability. Optics stability was determined by measurement of base curve radius over time at 37° C. in buffered saline.

TABLE 1

| | Ex 5 | Ex 6 | Ex 7 | Ex 8 | Comp1 | Comp2 |
|---|---|---|---|---|---|---|
| Prepolymer Ex 3 | 35 | 35 | — | 10.2 | — | — |
| Prepolymer Ex 4 | — | — | 35 | — | — | — |
| M2D25 | — | — | — | — | 10.2 | 7 |
| Tris | 35 | 35 | 35 | 30.8 | 30.8 | — |
| Tris/Dimer | — | — | — | — | — | 25 |
| NVP | 5 | 5 | 5 | 5 | 7 | — |
| MAA | 5 | 5 | 5 | 3 | 5 | 6 |
| HFIPMA | 15 | — | — | — | — | 55 |
| BHI | — | 15 | 15 | 44 | 40 | — |
| MMA | 5 | 5 | 5 | — | — | — |
| NPGDMA | — | — | — | 7 | 7 | 7 |
| Rockwell Hardness | 101 | 116 | 125 | 81 | 108 | 110 |
| Dk (barrer) | 146 | 145 | 166 | 117 | 96 | 100 |
| Tan δ temp (° C.) | 97 | 124 | 123 | 133 | 155 | NA |
| Optics Stability | Pass | Pass | Pass | — | Pass | Pass |

TABLE 2

| | Ex 9 | Ex 10 | Ex 11 | Ex 12 | Ex 13 |
|---|---|---|---|---|---|
| Prepolymer Ex 3 | 30 | 25 | 32.5 | 30 | 25 |
| Tris | 35 | 35 | 35 | 35 | 45 |

TABLE 2-continued

| | Ex 9 | Ex 10 | Ex 11 | Ex 12 | Ex 13 |
|---|---|---|---|---|---|
| NVP | 5 | 5 | 5 | 5 | 5 |
| MAA | 5 | 5 | 5 | 5 | 5 |
| BHI | 20 | 25 | 15 | 15 | 15 |
| MMA | 5 | 5 | 7.5 | 10 | — |
| Rockwell Hardness | 122 | 52 | 125 | 81 | 38 |
| Dk (barrer) | 189 | 159 | 170 | 142 | 154 |
| Tan δ temp (° C.) | 116 | 122 | 119 | 120 | 123 |
| Optics Stability | Pass | Pass | Pass | Pass | Pass |

TABLE 3

| | Ex 14 | Ex 15 | Ex 16 | Ex 17 | Ex 18 |
|---|---|---|---|---|---|
| Prepolymer Ex 3 | 20 | 15 | 19 | 18 | 17 |
| Tris | 50 | 55 | 50 | 50 | 50 |
| NVP | 5 | 5 | 5 | 5 | 5 |
| MAA | 5 | 5 | 5 | 5 | 5 |
| BHI | 15 | 15 | 15 | 15 | 15 |
| MMA | 5 | 5 | 5 | 5 | 5 |
| NPGDMA | — | — | 1 | 2 | 3 |
| Rockwell Hardness | 58 | 63 | 56 | 67 | 76 |
| Dk (barrer) | 152 | 139 | 154 | 148 | 126 |
| Tan δ temp (° C.) | 124 | 126 | 123 | 127 | 130 |
| Optics Stability | Pass | Pass | Pass | Pass | Pass |

For comparison purposes, formulations designated Comp 1 and Comp 2 in Table 1 were evaluated, these formulations containing a siloxane prepolymer lacking urethane or urea linkages. As seen in the above tables, the copolymers of this invention exhibited higher oxygen permeability while maintaining acceptable mechanical and optical properties.

EXAMPLE 19

Clinical Evaluation

Lenses were lathe-cut from the buttons of Example 7 and tested clinically. The lenses exhibited excellent wettability after 4 hours of study.

Although various preferred embodiments have been described, it is understood that the invention is not limited thereto and modifications and variations would be evident to a person of ordinary skill in the art.

We claim:

1. A rigid gas permeable contact lens that is the polymerization product of a monomeric mixture comprising a polysiloxane-containing urethane or urea prepolymer end-capped with polymerizable ethylenically unsaturated radicals, said rigid gas permeable contact lens having an oxygen permeability of at least 100 barrers, a Rockwell hardness of at least 90 or a Shore D hardness of at least 70 and a modulus of at least 800 MPa.

2. The contact lens of claim 1, having a toughness of at least 1.5 Mpa·mm/mm and a modulus of at least 800 Mpa.

3. The contact lens of claim 1, having an oxygen permeability of at least 120 barrers.

4. The contact lens of claim 3, having an oxygen permeability of at least 140 barrers.

5. The contact lens of claim 4, having an oxygen permeability of at least 160 barrers.

6. The contact lens of claim 1, wherein the monomer mixture further comprises a hydrophilic monomer.

7. The contact lens of claim 6, wherein the monomer mixture comprises at least one member selected from the group consisting of N-vinylpyrrolidone and methacrylic acid.

8. The contact lens of claim 1, wherein the monomer mixture further comprises a fluorinated monomer.

9. The contact lens of claim 8, wherein the monomer mixture comprises at least one member selected from the group consisting of a fluorinated (meth)acrylate and a fluorinated itaconate.

10. The contact lens of claim 1, wherein the monomer mixture further comprises a an ethylenically unsaturated monofunctional silicon-containing monomer.

11. The contact lens of claim 1, wherein the monomer mixture further comprises a hardness modifying (meth)acrylate monomer.

12. The contact lens of claim 11, wherein the monomer mixture comprises an alkyl (meth)acrylate monomer.

13. The contact lens of claim 1, wherein the monomer mixture further comprises at least one member selected from the group consisting of a polymerization initiator, an ultraviolet blocking agent, and a colorant.

14. The contact lens of claim 1, wherein the monomer mixture includes at least one prepolymer comprising blocks (I) and (II) and terminated at each end with an ethylenic unsaturated radical:

  (I)

  (II)

wherein:
each Dii is independently a diradical residue of a diisocyanate;
each Diol is independently a diradical residue of a diol having 1 to 10 carbon atoms;
each PS is independently a diradical residue of a polysiloxane-diol or -diamine;
each * is independently —NH—CO—NH—, —NH—COO— or —OCO—NH—;
x represents the number of blocks (I) and is at least 1, and
y represents the number of blocks (II) and is at least 1.

15. The contact lens of claim 1, wherein the monomer mixture includes at least one prepolymer having the general formulae:

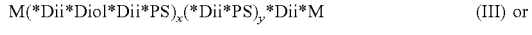  (III) or

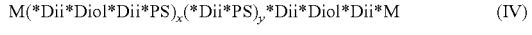  (IV)

wherein Dii, Diol, PS, *, x and y are as defined above, and M is a polymerizable ethylenically unsaturated radical.

16. The contact lens of claim 1, wherein the monomer mixture includes at least one prepolymer having the general formulae:

  (V)

  (VI)

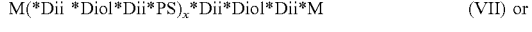  (VII) or

  (VIII)

wherein:
each Dii is independently a diradical residue of a diisocyanate;
each Diol is independently a diradlical residue of a diol having 1 to 10 carbon atoms;
each PS is independently a diradical residue of a polysiloxane-diol or -diamine;

each * is independently —NH—CO—NH—, —NH—COO— or —OCO—NH—;

each M is independently a polymerizable ethylenically unsaturated radical; and x represents the number of blocks (I) and is at least 1.

17. The contact lens of claim 1, wherein the monomer mixture comprises: the urethane or urea prepolymer; a hydrophilic monomer; a fluorinated monomer; an ethylenically unsaturated monofunctional silicon-containing monomer; a hardness modifying (meth)acrylate monomer; and at least one member selected from the group consisting of a polymerization initiator, an ultraviolet blocking agent, and a colorant.

18. A copolymer useful as a rigid gas permeable contact lens material that is the polymerization product of a monomeric mixture comprising a polysiloxane-containing urethane or urea prepolymer endcapped with polymerizable ethylenically unsaturated radicals, and one or more hydrophilic monomers, to provide a rigid gas permeable contact lens having an oxygen permeability of at least 100 barrers, a Rockwell hardness of at least 90 or a Shore D hardness of at least 70 and a modulus of at least 800 MPa.

19. The copolymer of claim 18, wherein the rigid gas permeable contact lens has a toughness of at least 1.5 Mpa·mm/mm and is optically clear.

20. The copolymer of claim 19, wherein the rigid gas permeable contact lens has an oxygen permeability of at least 140 barrers.

21. The copolymer of claim 18, wherein the monomer mixture further comprises: a fluorinated monomer; an ethylenically unsaturated monofunctional silicon-containing monomer; a hardness modifying (meth)acrylate monomer; and at least one member selected from the group consisting of a polymerization initiator, an ultraviolet blocking agent, and a colorant.

22. The copolymer of claim 18, wherein the monomer mixture includes at least one prepolymer comprising blocks (I) and (II) and terminated at each end with an ethylenic unsaturated radical:

$$(*Dii*Diol*Dii*PS)_x \qquad (I)$$

$$(*Dii*PS)_y \qquad (II)$$

wherein:

each Dii is independently a diradical residue of a diisocyanate;

each Diol is independently a diradical residue of a diol having 1 to 10 carbon atoms;

each PS is independently a diradical residue of a polysiloxane-diol or -diamine;

each * is independently —NH—CO—NH—, —NH—COO— or —OCO—NH—;

x represents the number of blocks (I) and is at least 1, and y represents the number of blocks (II) and is at least 1.

23. The copolymer of claim 22, wherein the monomer mixture includes at least one prepolymer having the general formulae:

$$M(*Dii*Diol*Dii*PS)_x(*Dii*PS)_y*Dii*M \qquad (III) \text{ or}$$

$$M(*Dii*Diol*Dii*PS)_x(Dii*PS)_y*Dii*Diol*Dii*M \qquad (IV)$$

wherein Dii, Diol, PS, *, x and y are as defined above, and M is a polymerizable ethylenically unsaturated radical.

24. The copolymer of claim 1, wherein the monomer mixture includes at least one prepolymer having the general formulae:

$$M(*Dii* PS)_x*Dii*M \qquad (V)$$

$$M(Dii*PS*Dii*Diol)_x*Dii*PS*Dii*M \qquad (VI)$$

$$M(*Dii*Diol*Dii*PS)_x*Dii*Diol*Dii*M \qquad (VII) \text{ or}$$

$$M(*PS*Dii)_x*PS*M \qquad (VIII)$$

wherein:

each Dii is independently a diradical residue of a diisocyanate; each Diol is independently a diradical residue of a diol having 1 to 10 carbon atoms;

each PS is independently a diradical residue of a polysiloxane-diol or -diamine;

each * is independently —NH—CO—NH—, —NH—COO— or —OCO—NH—;

each M is in dependently a polymerizable ethylenically unsaturated radical; and x represents the number of blocks (I) and is at least 1.

25. The copolymer of claim 18, having the shape of a cylindrical disk.

26. A combination comprising: a cylindrical disk formed from a copolymer that is the polymerization product of a monomeric mixture comprising a polysiloxane-containing urethane or urea prepolymer endcapped with polymerizable ethylenically unsaturated radicals, and one or more hydrophilic monomers; and packaged with the disk, printed instructions for lathing a rigid gas permeable contact lens from the disk, said rigid gas permeable contact lens having an oxygen permeability of at least 100 barrers, a Rockwell hardness of at least 90 or a Shore D hardness of at least 70 and a modulus of at least 800 MPa.

* * * * *